(12) United States Patent
Hickman

(10) Patent No.: US 8,928,169 B2
(45) Date of Patent: Jan. 6, 2015

(54) ENERGY GENERATION APPARATUS AND METHOD

(75) Inventor: Robert A. Hickman, Palos Verdes Estates, CA (US)

(73) Assignee: The Aerospace Corporation, El Segundo, CA (US)

( * ) Notice: Subject to any disclaimer, the term of this patent is extended or adjusted under 35 U.S.C. 154(b) by 1073 days.

(21) Appl. No.: 12/807,606

(22) Filed: Sep. 9, 2010

(65) Prior Publication Data

US 2012/0060828 A1 Mar. 15, 2012

(51) Int. Cl.
*F03D 9/00* (2006.01)

(52) U.S. Cl.
CPC ........... *F03D 9/007* (2013.01); *F05B 2240/131* (2013.01); *Y02E 10/72* (2013.01)
USPC .......................................................... 290/55

(58) Field of Classification Search
USPC ..................................... 290/54, 55
See application file for complete search history.

(56) References Cited

U.S. PATENT DOCUMENTS

| | | | | |
|---|---|---|---|---|
| 5,300,817 | A * | 4/1994 | Baird ............................... | 290/55 |
| 6,590,300 | B1 * | 7/2003 | Preito Santiago ............. | 290/55 |
| 2003/0236593 | A1 * | 12/2003 | Schumacher ................. | 700/291 |
| 2009/0212570 | A1 * | 8/2009 | Le et al. .......................... | 290/52 |

OTHER PUBLICATIONS

Mark J. Schroeder and Charles C. Buck, "Fire Weather—A Guide for Application of Meteorological Information to Forest Fire Control Operations," Chapter 4—"Atmospheric Stability," Agriculture Handbook 360, U.S. Department of Agriculture—Forest Service, May 1970.

Mark J. Schroeder and Charles C. Buck, "Fire Weather—A Guide for Application of Meteorological Information to Forest Fire Control Operations," Chapter 7—"Convective Winds," Agriculture Handbook 360, U.S. Department of Agriculture—Forest Service, May 1970.

Jeff Haby, "Superadiabatic Lapse Rate," downloaded from http://www.theweatherprediction.com/habyhints/31 in Jul. 2010.

"Glossary of Atmospheric Terms," downloaded from http://education.arm.gov/nsdl/Library/glossary.shtml in Jul. 2010.

"Atmospheric Thermodynamics 2 and dynamics," Rev. 16b, last edited Jul. 1, 2009, downloaded from http://www.recreationalflying.net/tutorials/meteorology/section1b.html on Nov. 22, 2010.

(Continued)

*Primary Examiner* — Tho D Ta
(74) *Attorney, Agent, or Firm* — K & L Gates LLP

(57) ABSTRACT

An energy generation apparatus is disclosed. The apparatus includes a base, a sidewall enclosing a perimeter of the base to define a first volume, and a tube having a first end and a second end. The base includes a solar energy collection surface. The first end of the tube is disposed in the first volume adjacent the base, and the second end of the tube is disposed in a second volume outside of the first volume. The apparatus also includes a fluid flow initiator to initiate a flow of a fluid from the first volume to the second volume through the tube when the fluid in the first volume has been heated by the solar energy collection surface to generate a super-adiabatic lapse rate.

28 Claims, 3 Drawing Sheets

(56) References Cited

OTHER PUBLICATIONS

"Environmental Lapse Rate," downloaded from www.physics.umt.edu/borealis/Environmental%20Lapse%20Rate.pdf on Jul. 5, 2010.

"The adiabatic atmosphere," downloaded from http://farside.ph.utexas.edu/teaching/sml/lectures/node56.html on Nov. 22, 2010.

"Lapse rate," downloaded from http://www.medbib.com/Adiabatic_lapse_rate on Nov. 22, 2010.

John Toohey-Morales, "Cloud Development and Precipitation," downloaded from www.stu.edu/IMGFCK/Image/Meteorology/.../clouddev.pps on Nov. 22, 2010.

"AWEA Electrical Guide to Utility Scale Wind Turbines," American Wind Energy Association, Mar. 2005.

Lorand Szabo, et al., "Simulation of Wind Turbine Driven Autonomous Squirrel Cage Induction Generators," 11th International Conference on Intelligent Engineering Systems, Jun. 29-Jul. 1, 2007, Budapest, Hungary.

\* cited by examiner

ENERGY GENERATION APPARATUS AND METHOD

STATEMENT REGARDING FEDERALLY SPONSORED RESEARCH OR DEVELOPMENT

None

BACKGROUND

Solar power has the potential to provide a significant portion of humanity's energy requirements. It is estimated that the Earth's land and oceans receive solar radiation at a rate of 96 petawatts (PW), or over 5,000 times the current rate of energy consumption worldwide. Harnessing solar power is problematic, however, because the absolute power level per unit area is relatively low. In the southwest region of the United States, for example, where solar energy is relatively plentiful, insolation averages approximately 5.5 kWh/m² per day. A number of approaches have been developed to transform solar energy into other forms of energy. For example, concentrating solar power (CSP) systems utilize lenses or mirrors and tracking systems to focus a large area of sunlight into a small beam. The concentrated light is then used as a heat source for a conventional power plant. Photovoltaic systems including solar panel arrays coupled to batteries and an inverter are also known.

Although installation of solar power systems for specialized applications is growing rapidly, solar power accounts for less than one-half percent of total energy consumption worldwide. A large percentage of this growth to date has been stimulated by government subsidies. In order for solar power to emerge as a primary energy source that is competitive with other forms of energy, a reduction in the installation cost per watt is necessary. Because harvesting solar power does not consume fuel resources, the cost of solar power is relatively low after installation is complete. The current cost per installed watt is approximately $5-7 USD for moderate to large scale installations.

SUMMARY

Various aspects of an apparatus for converting solar energy into other forms of energy are disclosed. In one embodiment, the apparatus includes a base, a sidewall enclosing a perimeter of the base to define a first volume, and a tube having a first end and a second end. The base includes a solar energy collection surface. The first end of the tube is disposed in the first volume adjacent the base, and the second end of the tube is disposed in a second volume outside of the first volume. The apparatus also includes a fluid flow initiator to initiate a flow of a fluid from the first volume to the second volume through the tube when the fluid in the first volume has been heated by the solar energy collection surface to generate a super-adiabatic lapse rate.

In another embodiment, the apparatus includes a solar energy collection surface to convectively heat a first volume of a fluid to generate a super-adiabatic lapse rate, and a fluid flow initiator to initiate a flow of the fluid from the first volume to a second volume through a tube when the super-adiabatic lapse rate is generated. The second volume is outside of the first volume. A first end of the tube is disposed in the first volume, and a second end of the tube is disposed in the second volume.

DESCRIPTION OF THE FIGURES

Various embodiments are described herein by way of example in conjunction with the following figures. It is to be appreciated that the figures are not to scale.

DESCRIPTION

Various embodiments of an apparatus for converting solar energy (e.g., sunlight) into other forms of energy (e.g., mechanical energy, electrical energy) are described herein. The apparatus may implement a controlled thermal convection process that includes collecting solar energy to create an unstable atmospheric condition, and subsequently destabilizing the atmospheric condition to generate a fluid flow. In one embodiment, the apparatus includes a turbine to convert the flow of the fluid into mechanical energy. In another embodiment, the apparatus includes a generator coupled to the turbine to convert the mechanical energy into electrical energy.

The Earth's atmosphere is not isothermal, and atmospheric temperature generally decreases with height. The rate of decreasing air temperature with altitude in a stationary atmosphere is generally referred to as the environmental lapse rate (ELR). Movement of air in the atmosphere is determined in part by the temperature of the air relative to the temperature of the surrounding atmosphere. For example, air that is warmer and less dense than the surrounding atmosphere rises, and air that is cooler and denser than the surrounding atmosphere falls. A parcel of rising air will expand due to reduced pressure and cool adiabatically without an exchange of heat to or from the parcel. For a parcel of dry air, the rate of temperature decrease with increasing altitude, referred to as the dry adiabatic lapse rate (DALR), is approximately 9.8° C. per kilometer. For a parcel of moist or saturated air, the rate of temperature decrease with increasing altitude, or the moist adiabatic lapse rate (MALR), is somewhat less (e.g., 5° C. per kilometer) due to latent heat release resulting from water condensation. The stability of an air parcel in the atmosphere is dependent upon the value of the ELR relative to the DALR and the MALR. If the ELR is less than the MALR, for example, the air parcel will be absolutely stable because it will cool more rapidly than surrounding air when rising, eventually resulting in a loss of buoyancy. If the ELR is between the MALR and the DALR, the air parcel is conditionally unstable. If the ELR exceeds the DALR, a condition referred to as a super-adiabatic lapse rate, the air parcel will be absolutely unstable and gain buoyancy as it rises by virtue of its less rapid cooling rate relative to the surrounding atmosphere.

Super-adiabatic lapse rates are a source of convective winds and occur naturally due to intense solar heating of air near the Earth's surface. In areas of high insolation, for example, heated air may accumulate in a layer near the ground and remain in vertical equilibrium until disturbed by a triggering action, such as an upward deflection caused by surface winds. The buoyant air then rises rapidly, drawing the hot air from the surface layer. Whirlwinds or dust devils are one example of airflow resulting from a super-adiabatic lapse rate.

Figure 1:
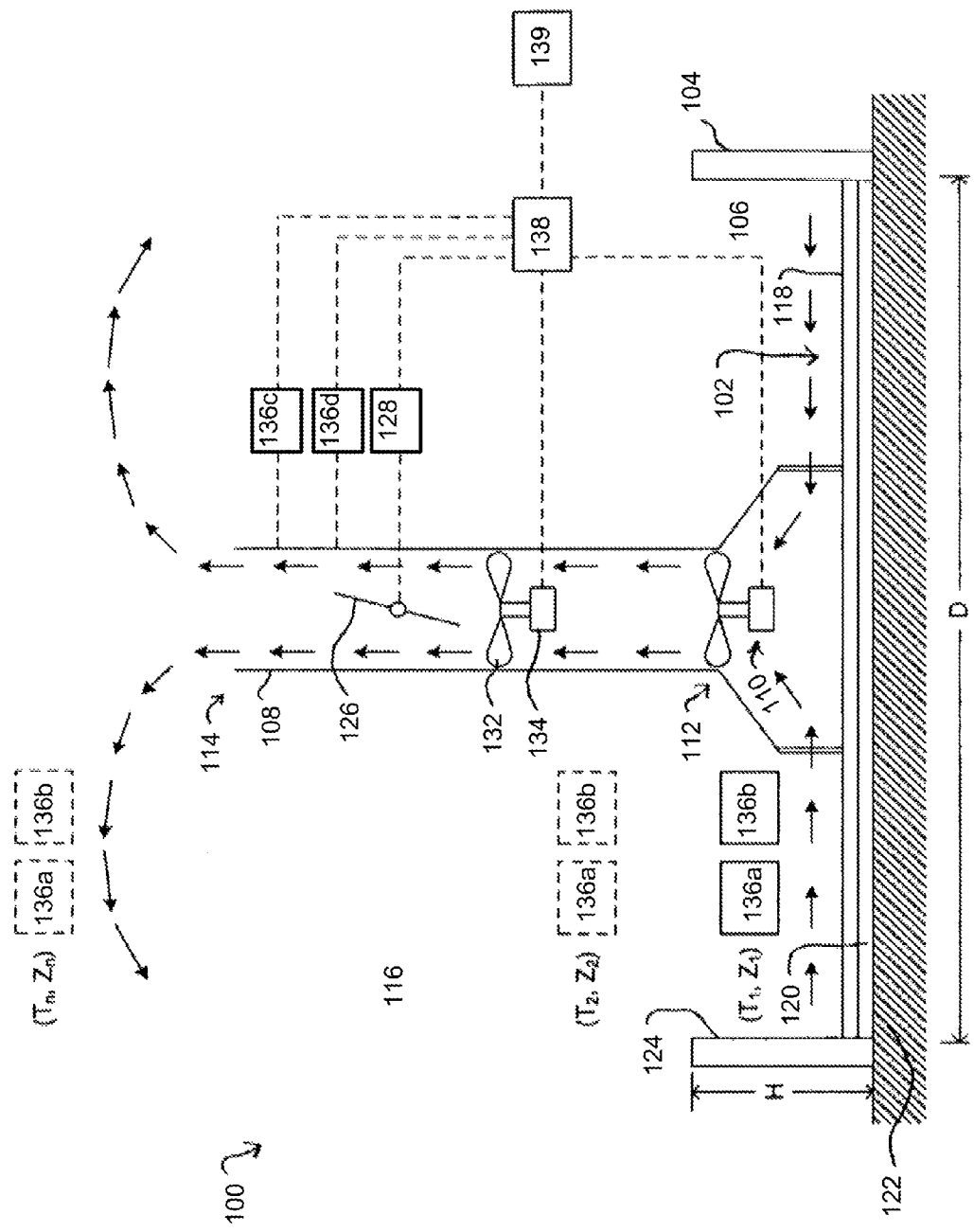
FIG. 1 is an apparatus for converting solar energy into other forms of energy according to one embodiment.

FIG. 1 illustrates one embodiment of an apparatus 100 for heating a volume of a fluid to generate a super-adiabatic lapse rate and subsequently triggering the resulting instability to generate a fluid flow. In certain embodiments, the apparatus 100 may be positioned outdoors on the Earth's surface, preferably at a geographic location having relatively high insolation, such as the southwestern United States, for example. In such embodiments, the operating fluid comprises air. It will be appreciated that the apparatus 100 is not limited to use on the Earth, and that non-Earth atmospheres exhibiting superadiabatic lapse rates (e.g., the Martian atmosphere) may provide a suitable operating environment for the apparatus 100. The illustrated embodiment comprises a base 102 and a sidewall 104 enclosing a perimeter of the base 102 to define a first volume 106. The apparatus 100 further comprises a tube 108 and a fluid flow initiator 110. The tube 108 comprises a first end 112 disposed in the first volume 106 adjacent the base 102, and a second end 114 disposed in a second volume 116 outside of the first volume 106.

The base 102 may comprise a solar energy collection surface 118 to receive solar radiation, and, optionally, a layer of insulation 120 disposed between an underside of the surface 118 and an underlying surface (e.g., supporting surface 122). The solar energy collection surface 118 may comprise any material(s) suitable for absorbing incident solar radiation to cause heating of the material(s), and, consequently, convective heating of a fluid (e.g., air) contained in the first volume 106. In certain embodiments, the solar energy collection surface 118 may comprise a solar selective surface designed to maximize absorption of solar radiation and minimize radiative heat loss. In one such embodiment, for example, the solar energy collection surface 118 may be fabricated using Solchrome solar selective coating sheets, available from Solchrome Private Limited, Himachal Pradesh, India, having an absorptivity of approximately 0.96 and an emissivity of approximately 0.12. In certain embodiments, base 102 may comprise a layer of insulation 120 to reduce conductive heat loss from the solar energy collection surface 118. In one embodiment, for example, the solar energy collection surface 118 may comprise a layer of insulation 120 integrally formed thereon, such as, for example, Solchrome flat plate solar collectors comprising a selective surface disposed on a layer of rock wool insulation, also available from Solchrome Private Limited. The base 102 may be formed modularly in certain embodiments using tiles or larger subsections. In other embodiments, the base 102 may be formed as a single, continuous piece. In certain embodiments, the base 102 may be formed on a surface 122 comprising a suitably rigid material, such as, for example, concrete, to protect the base 102 from underlying materials (e.g., soil, moisture) and provide suitable support for the base 102. In certain embodiments and as shown in FIG. 1, the base 102 may comprise a generally circular shape having a diameter D, although it will be appreciated that the base 102 may comprise other shapes, such as, for example, other curved shapes (e.g., ellipse, oval) or polygonal shapes. Additionally, although the base 102 in the embodiment of FIG. 1 is generally planar, in other embodiments the base 102 may comprise a non-planar (e.g., concave, convex) shape.

In certain embodiments, instead of being located on top of the Earth's surface, at least a portion of the base 102 and/or the sidewall 104 may be disposed in a depression formed in the Earth's surface. In one such embodiment, for example, the base 102 and the sidewall 104 may be disposed in a bowl-shaped opening formed in the Earth's surface. The depression may be naturally occurring and/or formed at least in part by excavation. Although the sidewall 104 may be formed on the sidewall of the depression, it will be appreciated that in other embodiments the sidewall of the depression may comprise a natural material (e.g., rock, clay, soil) suitable for forming the sidewall 104 without the need for additional sidewall material(s).

The sidewall 104 encloses the perimeter of the base 102 and extends above the solar energy collection surface 118 by a height H to define the first volume 106. In certain embodiments, an interior surface 124 of the sidewall 104 may extend perpendicularly upward from the base 102 such that the first volume 106 comprises a cylindrical shape when the base 102 comprises a planar, circular shape. In other embodiments, the interior surface 124 of the sidewall 104 may extend upward from the base 102 in a non-perpendicular manner (e.g., sloped). The sidewall 104 may generally be non-porous to prevent the passage of fluid between the first volume 106 and the second volume 116 via the sidewall 104. The sidewall 104 therefore laterally isolates and contains fluid in the first volume 106 to an extent, and reduces or prevents disruption or destabilization of the fluid by natural triggering actions (e.g., upward deflection caused by surface winds). The sidewall 104 may be modularly or integrally constructed using any suitable building material(s), such as, for example, concrete and/or steel. Although the height H of the sidewall 104 in FIG. 1 is uniform relative to the solar energy collection surface 118, in other embodiments H may be non-uniform.

Although the embodiment of FIG. 1 comprises a sidewall 104, other embodiments of the apparatus 100 may not include sidewall 104. For such embodiments, the first volume 106 comprises the volume of fluid positioned above the solar energy collection surface 118 that is convectively heated by the solar energy collection surface 118.

The first end 112 of the tube 108 is disposed in the first volume 106 and attached to the base 102 in a manner to permit a substantially unrestricted flow of fluid into the first end 112 from the first volume 106. In one embodiment, for example, one or more standoff members may be connected between the first end 112 of the tube 108 and the base 102 to support the tube 108 and provide suitable spacing to ensure unrestricted fluid flow. To reduce the turbulence in fluid entering the first end 112 of the tube 108, the first end 112 may comprise a flared opening, such as, for example, a bellmouth opening. In certain embodiments and as shown in FIG. 1, the tube 108 may generally be straight and comprise a circular cross-section, although it will be appreciated that other tube 108 geometries (e.g., curved, with a circular or non-circular cross-section) may alternatively be used. The cross-sectional area of the tube 108 may be selected to suitably accommodate a maximum or required fluid flow rate from the first volume 106. A maximum or required flow rate may be, for example, a flow rate that is balanced with a rate of heating and expansion of fluid in the first volume 106 such that a sustained fluid flow from the first volume 106 to the second volume 116 can be maintained. The height of the tube 108 may be selected to control, to an extent, a temperature differential between the first and second ends 112, 114 of the tube 108, and, therefore, a rate of fluid flow through the tube 108. Depending on the height of the tube 108, suitable materials for fabricating the tube 108 may include one or more of concrete, steel and fiberglass. It will be appreciated that in certain embodiments, the height of the tube 108 may require the use of guy wires or other supplemental support devices to provide adequate structural stability.

Embodiments of the apparatus 100 may comprise at least one damper 126 (e.g., butterfly damper, louver damper) to fluidically isolate the first end 112 of the tube 108 from the second end 114 of the tube 108 prior to the initiation of a fluid flow through the tube 108, and/or to control the fluid flow through the tube 108 thereafter. In certain embodiments, for example, a damper 126 may be used balance a fluid flow rate with a rate of heating and expansion of fluid in the first volume 106 so that a sustained fluid flow from the first volume 106 to the second volume 116 can be maintained. In certain embodiments and as shown in FIG. 1, at least one damper 126 may be disposed in the tube 108. At least one damper 126 may be coupled to a powered actuator 128 (e.g., electric actuator, pneumatic actuator) for modulating the damper 126. Each actuator 128 may in turn be coupled to a flow controller (e.g., electronic flow controller, pneumatic flow controller) for automatically controlling the actuator 128 based on, for example, a measured fluid flow through the tube 108. A single flow controller may be used to control one, or more than one, actuator 128. In certain embodiments a flow controller may be implemented by a processor, such as the processor 138 shown in FIG. 1 and discussed below. Additionally or alternatively, a damper 126 may be controlled manually, with or without a powered actuator 128.

The fluid flow initiator 110 operates to initiate a fluid flow from the first volume 106 to the second volume 116 through the tube 108. The fluid flow may be initiated, for example, by deflecting a portion of the fluid contained in the first volume 106 through the tube 108 via the first end 112 when determined that the fluid in the first volume 106 has been heated by the solar energy collection surface 118 to generate a super-adiabatic lapse rate. The fluid flow initiator 110 may generally comprise any device suitable for causing the fluid in the first volume 106 to enter the first end 112 of the tube 108 from the first volume 106, and for causing fluid within the tube 108 to discharge into the second volume 116 from the second end 114 of the tube 108. As shown in the embodiment of FIG. 1, for example, the fluid flow initiator 110 may comprise a motorized fan 110 disposed in the tube 108 adjacent the first end 112. Fluid from the first volume 106 may therefore be pulled into the first end 112 of the tube 108 and pushed toward the second end 114 of the tube 108. Although the fluid flow initiator 110 in FIG. 1 is disposed adjacent the first end 112 of the tube 108, it will be appreciated that the fluid flow initiator 110 may instead be positioned at other locations within the tube 108 (e.g., midsection, second end 114). In other embodiments, the fluid flow initiator 110 may be positioned, either entirely or partially, outside of the tube 108 adjacent to its first end 112 or second end 114. In certain embodiments, the tube 108 itself may operate as a fluid flow initiator 110 by virtue of a natural draft generated by the tube 108. In such embodiments, the draft may be controlled by suitably controlling a damper 126.

In certain embodiments, the apparatus 100 may comprise at least one turbine 132 to convert a fluid flow through the tube 108 into mechanical energy. The embodiment of FIG. 1 comprises a single turbine 132. The turbine 132 may comprise, for example, a wind turbine having one or more blades radially attached to a rotatable shaft, with each blade comprising an airfoil-shaped cross-section. The turbine 132 may be positioned such that the blades are suitably exposed to fluid flowing from the first volume 106. In certain embodiments and as shown in FIG. 1, for example, the turbine 132 may be disposed inside the tube 108 adjacent its first end 112, with the shaft substantially parallel to the direction of fluid flow. Fluid flow over the blades creates aerodynamic lift, which in turn causes the blades to apply mechanical torque to the shaft. It will be appreciated that the turbine 132 may instead be positioned at other locations within the tube 108 (e.g., midsection, second end 114), or positioned, either entirely or partially, outside of the tube 108 adjacent to its first end 112 or second end 114. In certain embodiments, the pitch of the turbine blades may be controllable during turbine operation (e.g., using a hydraulic actuator controlled by a processor, such as the processor 138 discussed below) to regulate turbine speed to an extent.

In certain embodiments, apparatus 100 may comprise a device coupled to the shaft of the turbine 132 for utilizing mechanical energy output through the shaft. In certain embodiments, the device may be coupled to the shaft via a gearbox for providing suitable speed and torque conversion. In one embodiment, the shaft may be coupled to a device that utilizes the supplied mechanical energy directly, such as, for example, a pump or a compressor. Additionally or alternatively, the shaft may be coupled to a generator 134, as shown in FIG. 1, to convert mechanical energy into electrical energy. In certain embodiments, the generator 134 may be a singly-fed electric machine having one active winding set, such as, for example, a squirrel cage induction generator or a wound-rotor induction generator. In embodiments using a wound-rotor induction generator, the generator 134 may comprise a controller circuit (which may comprise a processor, such as the processor 138 discussed below) for controlling the magnitude of the rotor current. In certain embodiments, the generator 134 may be a doubly-fed electric machine having two active winding sets, such as, for example, a doubly-fed induction generator. In one such embodiment, the generator 134 may comprise a four-quadrant power converter for controlling the magnitude and phase angle of the rotor current.

Although the fluid flow initiator 110 is shown as a component separate from the turbine 132 and the generator 134 in FIG. 1, in certain embodiments the fluid flow initiator 110 may comprise the turbine 132 and generator 134. For example, in embodiments in which the fluid flow initiator 110 comprises a motorized fan 110, the motor may be activated to rotate the fan when determined that the fluid in the first volume 106 has been heated to generate a super-adiabatic lapse rate in order to initiate a fluid flow through the tube 108. When a fluid flow from the first volume 106 to the second volume 116 resulting from the super-adiabatic lapse rate has been established, the motor may be deactivated. The fluid flow may then cause rotation of the fan, thereby causing the motor to generate electrical power. Accordingly, in such embodiments, the fan may operate as the turbine 132 and the motor may operate as the generator 134.

In certain embodiments, the apparatus 100 may comprise at least one processor 138 for executing instructions stored on at least one computer-readable medium 139 to monitor and/or control an operating parameter of the apparatus 100. Embodiments of a processor 138 and a computer-readable medium 139 are described below in connection with FIG. 3. Although the embodiment of FIG. 1 comprises a single processor 138 in communication with a single computer-readable medium 139, it will be appreciated that the apparatus 100 may generally comprise any number of processors 138, with each processor 138 in communication with any number of other processors 138 and any number of shared and/or different computer-readable mediums 139. In one embodiment, for example, the apparatus 100 may comprise a first processor 138 in communication with first and second computer-readable mediums 139 to monitor and/or control a first set of operating parameters, and a second processor 138 in communication with second and third computer-readable mediums 139 to monitor and/or control a second set of operating parameters.

In certain embodiments and as shown in FIG. 1, the apparatus 100 may comprise one or more sensors 136 in communication with the processor 138. The processor 138 may be programmed to monitor and/or control a number of operating parameters of the apparatus 100 based on electrical outputs from the one or more sensors 136. Depending upon the particular device used to implement the processor 138 (e.g., a computing device, mechanical controller, pneumatic controller, hydraulic controller), it will be appreciated an output from a sensor 136 may be a non-electrical output. In one embodiment, the sensors 136 may comprise a temperature sensor 136a (e.g., a thermistor) and height sensor 136b (e.g., an altimeter, a pressure sensor) for measuring temperature and a corresponding height of the measured temperature for two or more heights, and outputting electrical signals representative of these quantities. The temperature sensor 136a and the height sensor 136b may be carried aloft by a tethered or untethered balloon, for example, with the temperatures and corresponding heights being measured in the first volume 106, the second volume 116, or both the first and second volumes 106, 116. During ascent of the sensors 136a, 136b, a wireless transmitter (not shown) may communicate the sensor outputs for a number of heights to a receiver (not shown) in communication with the processor 138. In another embodiment, the one or more sensors 136 may comprise a vertically distributed array of temperature sensors (not shown), with the temperature sensors respectively positioned at known heights in the first volume 106, the second volume 116, or both the first and second volumes 106, 116. Depending upon the particular sensor heights involved, mechanisms for deploying the array may include one or more of tethered balloons, mast and tower structures, and the tube 108. Each temperature sensor output may be transmitted to the processor 138, wirelessly or by wired connection, and therein associated with a corresponding height value retrieved by the processor 138 from a computer-readable medium 139. As discussed below, the processor 138 may monitor temperature as a function of height and control activation of the fluid flow initiator 110 when the monitored values indicate that the fluid in the first volume 106 has been heated to generate a super-adiabatic lapse rate.

In certain embodiments, the one or more sensors 136 may comprise sensors for determining when a fluid flow through the tube 108 exists and/or determining a volumetric flow rate through the tube 108. In one embodiment, for example, the sensors 136 may comprise a flow switch 136c for outputting a discrete signal to the processor 138 for enabling the processor 138 to determine when a fluid flow through the tube 108 exceeds, or is less than, a predetermined flow threshold. Additionally or alternatively, the sensors 136 may comprise a turbine flow meter 136d for outputting an analog signal or discrete signal pulses to the processor 138 for enabling the processor 138 to determine a volumetric flow rate through the tube 108. In yet another embodiment, the sensors 136 may comprise a pressure-based flow sensor (not shown), such as a differential pressure sensor coupled to a pitot tube, for outputting a signal indicative of a fluid speed to the processor 138 from which the processor 138 may determine a volumetric flow rate.

In certain embodiments, the one or more sensors 136 may comprise position sensors (e.g., limit switch, potentiometer) for providing positional feedback for the at least one damper 126. In certain embodiments, the one or more sensors 136 may comprise sensors for providing feedback relating to electrical and/or other operating parameters of the generator 134, such as, for example, generator output voltage (e.g., line voltage, phase voltage), generator output current (e.g., phase current), angles of the generator output voltage and current, generator output frequency, generator power per phase, generator total output power, generator stator temperature, generator bearing temperature and generator shaft speed.

In certain embodiments, the processor 138 may be programmed to determine temperature change as a function of height in order to determine the ELR. The temperature and height information necessary to determine the ELR may be derived from temperature sensor outputs, height sensor outputs and/or other information accessible to the processor 138 (e.g., temperature sensor height data stored in a computer-readable medium 139 accessible to the processor 138), as discussed above. In one embodiment, the processor 138 may be programmed to compare the determined ELR to the DALR (which is constant at approximately 9.8° C. per kilometer) in order to determine when a super-adiabatic lapse rate condition exists. For example, the processor 138 may determine that a super-adiabatic lapse rate exists when the ELR is greater than the DALR, or when the ELR exceeds the DALR by a predetermined threshold. In another embodiment, the processor 138 may be programmed to predict when a super-adiabatic lapse rate condition is likely to exist, such as when the ELR is at or near a maximum value, or when a temperature of the fluid in the first volume 106 is at or near a maximum value. Such predictions may be based on, for example, real-time sensor data (e.g., current temperature versus height profiles), corresponding historical sensor data, or a combination of both real-time and historical sensor data.

In other embodiments, the processor 138 may be programmed to determine or predict when a super-adiabatic lapse rate condition exists based on inputs provided to the processor 138 from an information source external to the apparatus 100. In certain embodiments, for example, an operator of the apparatus 100 may manually provide one or more inputs to the processor 138 (e.g., using any of the I/O devices 150 discussed below in connection with FIG. 3) from which the processor 138 may determine the existence of a super-adiabatic lapse rate condition. Such inputs may comprise, for example, any of temperature information, height information, and a determination by the operator (or by another person, device, or system) that a super-adiabatic lapse rate condition exists. In certain embodiments, such inputs may be automatically transmitted to the processor 138 (e.g., via a data port of the processor 138) from another device or system (e.g., a weather station server, a weather satellite) that is in communication with the processor 138.

When the processor 138 determines that a super-adiabatic lapse rate exists, or is likely to exist, the processor 138 may be programmed to activate the fluid flow initiator 110 for an amount of time sufficient to destabilize the fluid in the first volume 106 to initiate a fluid flow from the first volume 106 to the second volume 116, after which time the processor 138 may deactivate the fluid flow initiator 110. In embodiments in which the fluid flow initiator 110 comprises a motorized fan 110, for example, the processor 138 may control a contactor, which in turn controls activation and deactivation of the motorized fan 110. In one embodiment, the processor 138 may be programmed to activate the fluid flow initiator 110 for a predetermined amount of time (e.g., 3 minutes). In another embodiment, the processor 138 may be programmed to activate the fluid flow initiator 110 until a self-sustaining fluid flow is determined by the processor 138 based on, for example, a flow switch output, a volumetric flow rate computed by the processor 138 or a sufficient electrical output by a generator 134. In certain embodiments, the processor 138 may be programmed to control other operational aspects of the apparatus 100 based on the processor's 138 determination of a self-sustaining fluid flow. Such operational aspects may include, for example, modulating the at least one damper 126 by controlling the corresponding actuator(s) 128 and controlling the pitch of the turbine blades by controlling the corresponding actuator.

Figure 2:
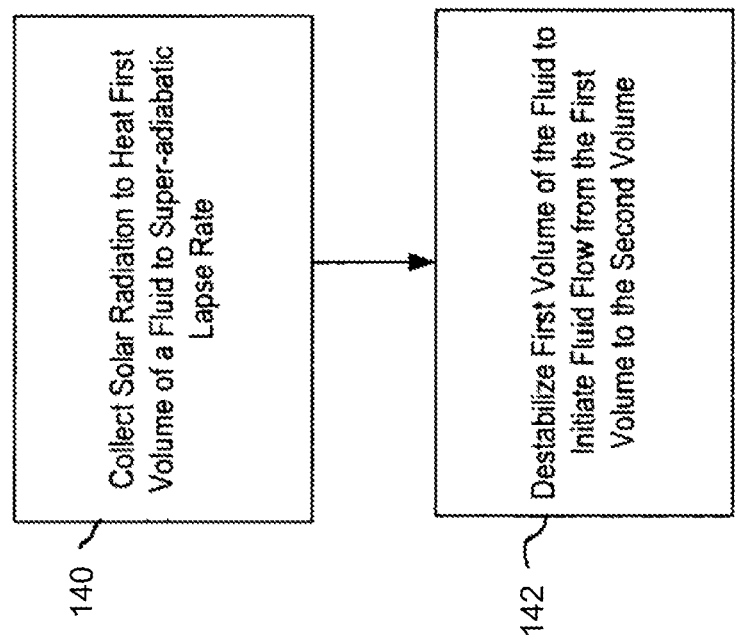
FIG. 2 is a process according to one embodiment.

FIG. 2 is a process implemented using the apparatus 100 in one embodiment. At step 140, a first volume 106 of a fluid is heated to generate a super-adiabatic lapse rate by collecting solar radiation. At step 142, the first volume 106 of the fluid is destabilized to initiate a directed flow of the fluid from the first volume 106 to a second volume 116 outside of the first volume 106. In certain embodiments, the process may include converting the flow of the fluid into mechanical energy using a turbine 132, and, optionally, converting the mechanical energy into electrical energy using a generator 134 coupled to the turbine 132.

In certain embodiments, the process may include determining when the first volume 106 of the fluid has been heated to generate a super-adiabatic lapse rate. This determination may include determining an environmental lapse rate, comparing the environmental lapse rate to a dry adiabatic lapse rate, and determining that the first volume 106 of the fluid has been heated to generate a super-adiabatic lapse rate when the environmental lapse rate is greater than the dry adiabatic lapse rate.

In areas of relatively high insolation (e.g., 5.5 kWh/m$^2$ per day in southwest regions of the Unites States), it is expected that the temperature of the solar energy collection surface 118 would rise to approximately 102° C., with approximately 14% of the absorbed solar energy lost to radiation, 11% to conductive ground losses, and 75% transferred to the fluid in the first volume 106 through convection. Moderately-sized wind turbines operate at an efficiency of approximately 40%. At a convective heating rate of 12 kJ/m$^2$/hour, it is estimated that an acre of land will generate approximately 68,000 m$^3$ of air moving at a vertical velocity of approximately 64 km/hour, translating into an average power generation rate of 91 kW per acre.

It is anticipated that embodiments of the apparatus 100 will significantly reduce the current cost per installed watt. For example, Solchrome solar selective coating sheets produced in large quantities can be purchased for approximately $20 USD/m$^2$. An insulation layer would add approximately $4 USD/m$^2$. Ground preparation and installation would add an additional $10 USD/m$^2$. Moderately-sized commercial wind turbine generators cost approximately $2,000 USD/kW installed, or $180,000 USD for a 90 kW wind turbine generator. This results in a total cost per acre of approximately $318,000 USD, or about $3.5 USD per watt of installed power. For megawatt installations, it is expected that the cost could be further reduced due to economies of scale to about $2.7 USD per watt of installed power. Federal and state incentives may further reduce the cost of installation, as well as establish preferential rates for generated solar power. This cost per installed watt ($2.7-3.5 USD) is approximately 50% less than the current cost ($5-7 USD). It is anticipated that this significant reduction in cost would spur increased used of solar power systems and a significant reduction in fossil fuel dependence. Additionally, the expected cost of operation is relatively low (less than 0.10 USD per KWh), which is commensurate with other solar power system technologies.

Figure 3:
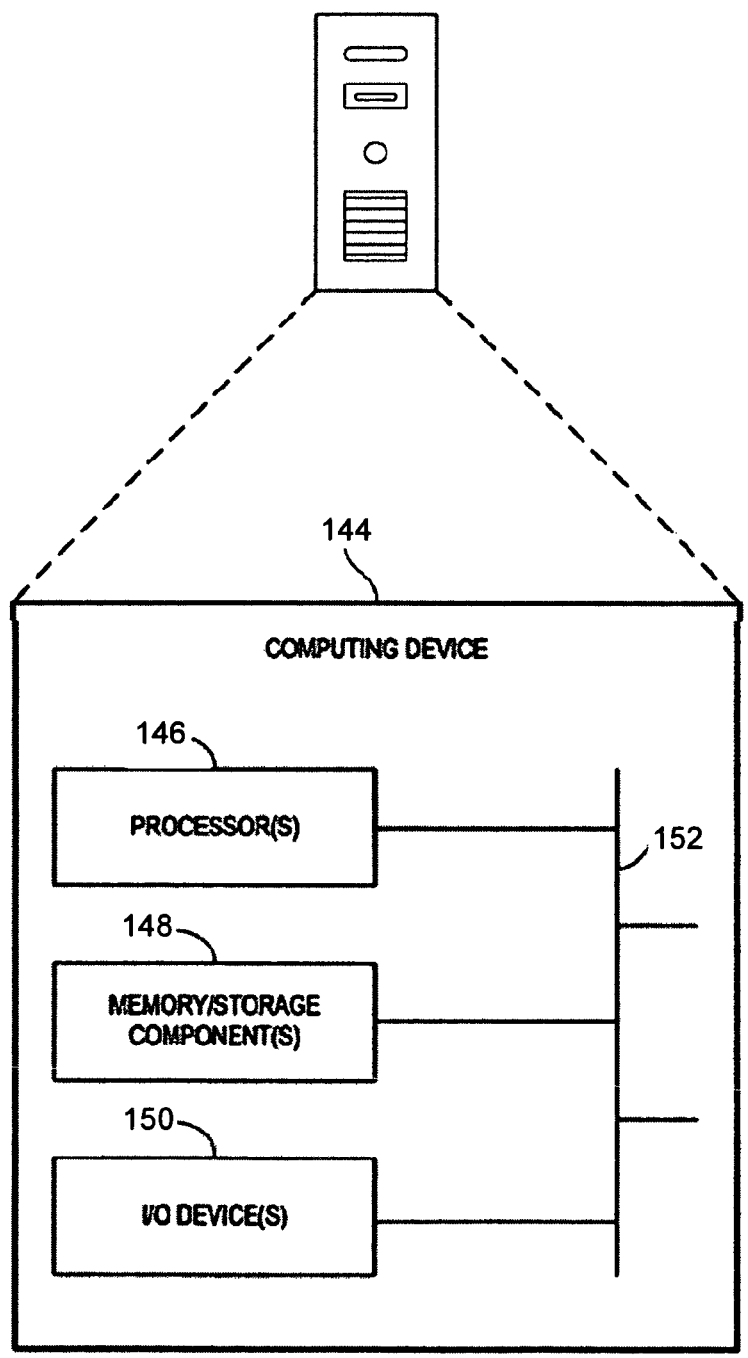
FIG. 3 is a computing device according to one embodiment.

It will be appreciated by one of ordinary skill in the art that at least some of the embodiments described herein or parts thereof may be implemented using hardware, firmware and/or software. The firmware and software may be implemented using any suitable computing device(s). FIG. 3 shows an example of a computing device 144 according to one embodiment that may be used to implement a processor 138 and a computer-readable medium 139. For the sake of clarity, the computing device 144 is illustrated and described here in the context of a single computing device. However, it is to be appreciated and understood that any number of suitably configured computing devices 144 can be used to implement any of the described embodiments. It also will be appreciated that one such device or multiple devices may be shared in a time division multiplex mode among compensators for multiple power amplifiers, as may be the case, for example, in a base station of a mobile communication network. For example, in at least some implementations, multiple communicatively linked computing devices 144 are used. One or more of these devices may be communicatively linked in any suitable way such as via one or more networks. One or more networks can include, without limitation: the Internet, one or more local area networks (LANs), one or more wide area networks (WANs) or any combination thereof.

In this example, the computing device 144 may comprise one or more processor circuits or processing units 146, one or more memory circuits and/or storage circuit component(s) 148 and one or more input/output (I/O) circuit devices 150. Additionally, the computing device 144 comprises a bus 152 that allows the various circuit components and devices to communicate with one another. The bus 152 represents one or more of any of several types of bus structures, including a memory bus or memory controller, a peripheral bus, an accelerated graphics port, and a processor or local bus using any of a variety of bus architectures. The bus 152 may comprise wired and/or wireless buses.

The processing unit 146 may be responsible for executing various software programs such as system programs, applications programs, and/or program modules/blocks to provide computing and processing operations for the computing device 144. The processing unit 146 may be responsible for performing various data communications operations for the computing device 144 such as transmitting and receiving data information over one or more wired or wireless communications channels. Although the processing unit 146 of the computing device 144 is shown in the context of a single processor architecture, it may be appreciated that the computing device 144 may use any suitable processor architecture and/or any suitable number of processors in accordance with the described embodiments. In one embodiment, the processing unit 146 may be implemented using a single integrated processor.

The processing unit 146 may be implemented as a host central processing unit (CPU) using any suitable processor circuit or logic device (circuit), such as a as a general purpose processor. The processing unit 146 also may be implemented as a chip multiprocessor (CMP), dedicated processor, embedded processor, media processor, input/output (I/O) processor, co-processor, microprocessor, controller, microcontroller, application specific integrated circuit (ASIC), field programmable gate array (FPGA), programmable logic device (PLD), or other processing device in accordance with the described embodiments.

As shown, the processing unit 146 may be coupled to the memory and/or storage component(s) 148 through the bus 152. The bus 152 may comprise any suitable interface and/or bus architecture for allowing the processing unit 146 to access the memory and/or storage component(s) 148. Although the memory and/or storage component(s) 148 may be shown as being separate from the processing unit 146 for purposes of illustration, it is worthy to note that in various embodiments some portion or the entire memory and/or storage component(s) 148 may be included on the same integrated circuit as the processing unit 146. Alternatively, some portion or the entire memory and/or storage component(s) 148 may be disposed on an integrated circuit or other medium (e.g., hard disk drive) external to the integrated circuit of the processing unit 146. In various embodiments, the computing device 144 may comprise an expansion slot to support a multimedia and/or memory card, for example.

The memory and/or storage component(s) 148 represent one or more computer-readable media. The memory and/or storage component(s) 148 may be implemented using any computer-readable media capable of storing data such as volatile or non-volatile memory, removable or non-removable memory, erasable or non-erasable memory, writeable or re-writeable memory, and so forth. The memory and/or storage component(s) 148 may comprise volatile media (e.g., random access memory (RAM)) and/or nonvolatile media (e.g., read only memory (ROM), Flash memory, optical disks, magnetic disks and the like). The memory and/or storage component(s) 148 may comprise fixed media (e.g., RAM, ROM, a fixed hard drive) as well as removable media (e.g., a Flash memory drive, a removable hard drive, an optical disk). Examples of computer-readable storage media may include, without limitation, RAM, dynamic RAM (DRAM), Double-Data-Rate DRAM (DDRAM), synchronous DRAM (SDRAM), static RAM (SRAM), read-only memory (ROM), programmable ROM (PROM), erasable programmable ROM (EPROM), electrically erasable programmable ROM (EEPROM), flash memory (e.g., NOR or NAND flash memory), content addressable memory (CAM), polymer memory (e.g., ferroelectric polymer memory), phase-change memory, ovonic memory, ferroelectric memory, silicon-oxide-nitride-oxide-silicon (SONOS) memory, magnetic or optical cards, or any other type of media suitable for storing information.

The one or more I/O devices 150 may allow a user to enter commands and information to the computing device 144, and also may allow information to be presented to the user and/or other components or devices. Examples of input devices include data ports, ADCs, DACs, a keyboard, a cursor control device (e.g., a mouse), a microphone, a scanner and the like. Examples of output devices include data ports, ADCs, DACs, a display device (e.g., a monitor or projector, speakers, a printer, a network card). The computing device 144 may comprise an alphanumeric keypad coupled to the processing unit 146. The keypad may comprise, for example, a QWERTY key layout and an integrated number dial pad. The computing device 144 may comprise a display coupled to the processing unit 146. The display may comprise any suitable visual interface for displaying content to a user of the computing device 144. In one embodiment, for example, the display may be implemented by a liquid crystal display (LCD) such as a touch-sensitive color (e.g., 76-bit color) thin-film transistor (TFT) LCD screen. The touch-sensitive LCD may be used with a stylus and/or a handwriting recognizer program.

The processing unit 146 may be arranged to provide processing or computing resources to the computing device 144. For example, the processing unit 146 may be responsible for executing various software programs including system programs such as operating system (OS) and application programs. System programs generally may assist in the running of the computing device 144 and may be directly responsible for controlling, integrating, and managing the individual hardware components of the computer system. The OS may be implemented, for example, as a Microsoft® Windows OS, Symbian OS™, Embedix OS, Linux OS, Binary Run-time Environment for Wireless (BREW) OS, Java OS, or other suitable OS in accordance with the described embodiments. The computing device 144 may comprise other system programs such as device drivers, programming tools, utility programs, software libraries, application programming interfaces (APIs), and so forth.

Various embodiments may be described herein in the general context of computer executable instructions, such as software or program modules/blocks, being executed by a computer. Generally, program modules/blocks include any software element arranged to perform particular operations or implement particular abstract data types. Software can include routines, programs, objects, components, data structures and the like that perform particular tasks or implement particular abstract data types. An implementation of these modules/blocks or components and techniques may be stored on some form of computer-readable media. In this regard, computer-readable media can be any available medium or media used to store information and accessible by a computing device. Some embodiments also may be practiced in distributed computing environments where operations are performed by one or more remote processing devices that are linked through a communications network. In a distributed computing environment, program modules/blocks may be located in both local and remote computer storage media including memory storage devices.

Although some embodiments may be illustrated and described as comprising functional component or modules/blocks performing various operations, it can be appreciated that such components or modules/blocks may be implemented by one or more hardware components, software components, and/or combination thereof. The functional components and/or modules/blocks may be implemented, for example, by logic (e.g., instructions, data, and/or code) to be executed by a logic device (e.g., processor). Such logic may be stored internally or externally to a logic device on one or more types of computer-readable storage media. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSPs), field programmable gate array (FPGA), logic gates, registers, semiconductor devices, chips, microchips, chip sets, and so forth. Examples of software may include software components, programs, applications, computer programs, application programs, system programs, machine programs, operating system software, middleware, firmware, software modules/blocks, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

Although embodiments of the apparatus 100 described above may implement a processor 138 using a computing device (such as the computing device 144, for example) it will be appreciated that in other embodiments other devices may alternatively or additionally be used to implement a processor 138. Such devices may comprise, for example, any of an electronic analog controller, a mechanical controller, a pneumatic controller, and a hydraulic controller. It will additionally be appreciated that in certain embodiments, some or all of the monitoring and control functions of the apparatus 100 may be performed manually, by, for example, an operator of the apparatus 100. For example, an operator of the apparatus 100 may manually activate and deactivate the fluid flow initiator 110 and/or manually modulate the at least one damper 126.

It also is to be appreciated that the described embodiments illustrate example implementations, and that the functional components and/or modules/blocks may be implemented in various other ways which are consistent with the described embodiments. Furthermore, the operations performed by such components and/or modules/blocks may be combined and/or separated for a given implementation and may be performed by a greater number or fewer number of components and modules/blocks.

It is worthy to note that any reference to "one embodiment" or "an embodiment" means that a particular feature, structure, or characteristic described in connection with the embodiment is included in at least one embodiment. The appearances of the phrase "in one embodiment" in the specification are not necessarily all referring to the same embodiment.

Unless specifically stated otherwise, it may be appreciated that terms such as "processing," "computing," "calculating," "determining," or the like, refer to the action and/or processes of a computer or computing system, or similar electronic computing device, that manipulates and/or transforms data represented as physical quantities (e.g., electronic) within registers and/or memories into other data similarly represented as physical quantities within the memories, registers or other such information storage, transmission or display devices.

While certain features of the embodiments have been illustrated as described above, many modifications, substitutions, changes and equivalents will now occur to those skilled in the art. It is therefore to be understood that the appended claims are intended to cover all such modifications and changes as fall within the scope of the embodiments.

What is claimed is:

1. An apparatus, comprising:
a base comprising a solar energy collection surface;
a sidewall extending above the solar energy collection surface, enclosing a perimeter of the base to define a first volume;
a tube extending above the solar energy collection surface and the sidewall, the tube comprising a first end and a second end, wherein the first end is disposed in the first volume adjacent the base, and the second end is disposed in a second volume outside of the first volume; and
a fluid flow initiator to initiate a flow of a fluid from the first volume to the second volume through the tube when the fluid in the first volume has been heated by the solar energy collection surface to generate a super-adiabatic lapse rate.

2. The apparatus of claim 1, wherein the solar energy collection surface comprises a solar selective surface.

3. The apparatus of claim 1, wherein the base comprises an insulation layer disposed between an underside of the solar energy collection surface and a surface underlying the base.

4. The apparatus of claim 1, comprising:
at least one damper to control the flow of the fluid through the tube.

5. The apparatus of claim 1, wherein the fluid flow initiator comprises a motorized fan.

6. The apparatus of claim 1, comprising:
a turbine to convert the flow of the fluid into mechanical energy.

7. The apparatus of claim 6, comprising:
a generator coupled to the turbine to generate electrical energy.

8. The apparatus of claim 7, wherein the fluid flow initiator comprises the turbine and the generator.

9. The apparatus of claim 1, comprising:
at least one processor in communication with at least one computer-readable medium;
wherein the at least one computer-readable medium comprises instructions for causing the at least one processor to at least one of monitor an operating parameter of the apparatus and control the operating parameter of the apparatus.

10. The apparatus of claim 9, comprising:
a first processor in communication with a first computer-readable medium; and
a second processor in communication with a second computer-readable medium.

11. The apparatus of claim 9, wherein the at least one computer-readable medium comprises instructions for causing the at least one processor to:
determine when the super-adiabatic lapse rate is generated; and
activate the fluid flow initiator when determined that the super-adiabatic lapse rate has been generated.

12. The apparatus of claim 11, wherein the at least one computer-readable medium comprises instructions for causing the at least one processor to:
determine an environmental lapse rate;
compare the environmental lapse rate to a dry adiabatic lapse rate; and
determine that the super-adiabatic lapse rate has been generated when the environmental lapse rate exceeds the dry adiabatic lapse rate.

13. The apparatus of claim 9, comprising:
at least one sensor in communication with the at least one processor.

14. The apparatus of claim 13, wherein the at least one sensor comprises an array of temperature sensors disposed in the first volume and in the second volume, and wherein the at least one computer-readable medium comprises instructions for causing the at least one processor to determine an environmental lapse rate based on a height of each temperature sensor and an output of each temperature sensor.

15. The apparatus of claim 13, wherein the at least one sensor comprises:
a temperature sensor; and
a height sensor for indicating a height of the temperature sensor;
wherein the at least one computer-readable medium comprises instructions for causing the at least one processor to determine an environmental lapse rate based on an output of the temperature sensor and an output of the height sensor at two or more different heights.

16. The apparatus of claim 13, wherein the at least one sensor comprises a flow sensor, and wherein the at least one computer-readable medium comprises instructions for causing the at least one processor to determine the flow of the fluid through the tube based on an output of the flow sensor.

17. The apparatus of claim 16, wherein the at least one computer-readable medium comprises instructions for causing the at least one processor to deactivate the fluid flow initiator based on the output of the flow sensor.

18. The apparatus of claim 16, wherein the at least one computer-readable medium comprises instructions for causing the at least one processor to control the flow of the fluid through the tube based on the output of the flow sensor.

19. A method for using an apparatus, the apparatus comprising: a solar energy collection surface to convectively heat a first volume of a fluid positioned above the energy collection surface to generate a super-adiabatic lapse rate; a tube comprising a first end and a second end, wherein the first end is disposed in the first volume, and the second end is disposed in a second volume outside of the first volume; and a fluid flow initiator to initiate a flow of the fluid from the first volume to the second volume through the tube when the super-adiabatic lapse rate is generated, the method comprising:
collecting solar radiation to heat the first volume of a first fluid to generate a super-adiabatic lapse rate; and destabilizing the first volume of the fluid with the fluid flow initiator to initiate a directed flow of the fluid from the first volume to a second volume outside of the first volume.

20. The method of claim 19, comprising:

determining an environmental lapse rate;

comparing the environmental lapse rate to a dry adiabatic lapse rate; and determining that the super-adiabatic lapse rate has been generated when the environmental lapse rate is greater than the dry adiabatic lapse rate.

21. The method of claim 19, comprising:

converting the flow of the fluid into mechanical energy using a turbine; and converting the mechanical energy into electrical energy using a generator coupled to the turbine.

22. An apparatus, comprising:

a solar energy collection surface to convectively heat a first volume of a fluid to generate a super-adiabatic lapse rate, wherein the first volume of the fluid is positioned above the solar energy collection surface;

a tube comprising a first end and a second end, wherein the first end is disposed in the first volume, and the second end is disposed in a second volume outside of the first volume; and a fluid flow initiator to initiate a flow of the fluid from the first volume to the second volume through the tube when the super-adiabatic lapse rate is generated.

23. The apparatus of claim 22, comprising:

a turbine to convert the flow of the fluid into mechanical energy.

24. The apparatus of claim 23, comprising:

a generator coupled to the turbine to generate electrical energy.

25. The apparatus of claim 24, wherein the fluid flow initiator comprises the turbine and the generator.

26. The apparatus of claim 1, wherein the first volume is substantially unenclosed above the solar energy collection surface.

27. The method of claim 19, wherein the first volume is substantially unenclosed above the solar energy collection surface.

28. The apparatus of claim 22, wherein the first volume is substantially unenclosed above the solar energy collection surface.

\* \* \* \* \*